United States Patent [19]

McMurtry

[11] Patent Number: 5,735,180
[45] Date of Patent: Apr. 7, 1998

[54] INDEXING MECHANISM

[75] Inventor: David R. McMurtry, Wotton-Under-Edge, United Kingdom

[73] Assignee: Renishaw PLC, Gloucestershire, United Kingdom

[21] Appl. No.: 586,899

[22] PCT Filed: May 22, 1995

[86] PCT No.: PCT/GB95/01158

§ 371 Date: Feb. 6, 1996

§ 102(e) Date: Feb. 6, 1996

[87] PCT Pub. No.: WO95/32838

PCT Pub. Date: Dec. 7, 1995

[30] Foreign Application Priority Data

Jun. 1, 1994 [GB] United Kingdom ............... 9410989

[51] Int. Cl.⁶ ........................................... B23Q 16/08
[52] U.S. Cl. ........................... 74/813 R; 74/813 L
[58] Field of Search ........................... 74/813 R, 813 L

[56] References Cited

U.S. PATENT DOCUMENTS

| 3,088,340 | 5/1963 | Shotey | 74/813 |
| 3,090,633 | 5/1963 | Farnsworth | 74/813 X |
| 3,177,740 | 4/1965 | Firestone et al. | 74/813 X |
| 3,252,358 | 5/1966 | Moncrieff . | |
| 3,846,912 | 11/1974 | Newbould | 74/813 R X |
| 3,908,484 | 9/1975 | Degen et al. | 74/813 R |
| 4,060,007 | 11/1977 | Levesque . | |
| 4,153,998 | 5/1979 | McMurtry . | |
| 4,644,825 | 2/1987 | Yamazaki | 74/813 R |

FOREIGN PATENT DOCUMENTS 392 660   10/1990   European Pat. Off. .
2 163 979  3/1986   United Kingdom .

OTHER PUBLICATIONS

Gleason Machine Division Brochure, "Curvic Couplings", New York, USA, 7 pages.

Primary Examiner—Rodney H. Bonck
Assistant Examiner—Saul J. Rodriguez
Attorney, Agent, or Firm—Oliff & Berridge, PLC

[57] ABSTRACT

An indexing mechanism includes a first body and a second body. The first and second bodies are rotatable relative to each other about a plurality of index positions which are provided at discretely spaced angular orientations about the axis. The bodies are relatively moveable in an axle direction to facilitate disengagement from a given index position.

6 Claims, 3 Drawing Sheets

INDEXING MECHANISM

BACKGROUND

The present invention relates to an indexing mechanism for angularly orienting one body relative to another in a number of discretely spaced and highly repeatable indexed locations. Such indexing mechanisms are typically used in articulating probe heads or rotary tables, which may be employed on coordinate positioning machines such as coordinate measuring machines or machine tools.

One known form of indexing mechanism includes a circular array of balls, provided on one of the two bodies, and three rollers, provided on the other of the two bodies, equispaced and extending radially with respect to the axis of rotation of the two bodies. In a given indexed orientation, each of the rollers seats in the convergent surfaces defined by an adjacent pair of balls in the circular array; the number of possible indexed orientations is defined by the number of pairs of convergent surfaces provided by the circular array of balls over a single 360° rotation of one body relative to the other. In an alternative and entirely equivalent form of this indexing mechanism, a circular array of radially extending and equispaced rollers is provided on one of the bodies, and three balls, positioned at the vertices of an equilateral triangle are provided on the other of the two bodies; each of the balls sits in the convergent surfaces defined by an adjacent pair of rollers. A further known form of indexing mechanism is provided by two identical and mutually engageable rings of gear teeth, this form of indexing mechanism being known as a Hirth coupling.

SUMMARY OF THE INVENTION

The present invention seeks to provide an alternative indexing mechanism for first and second relatively rotatable bodies, comprising: a circular array of first elongate members provided on said first body, each first member having a pair of circumferentially spaced first surfaces, with confronting first surfaces from adjacent first members being mutually convergent; at least three second members provided on said second body, each second member having a pair of circumferentially spaced second surfaces, and being adapted to seat in a cleft defined by a pair of said mutually convergent first surfaces; wherein at least one of the first members and second members are symmetrical, and wherein a region of each of the surfaces of said at least one of the first members and the second members are curved, and have a radius of curvature greater than half the distance between centers of adjacent first members.

In one preferred embodiment, the curvature of said region of each of the curved surfaces will take place at least in a plane orthogonal to said axis. In a second preferred embodiment, the curvature of said region of each of the curved surfaces will take place in two mutually orthogonal planes, each of which lie parallel with said axis. In a further preferred embodiment, the curvature of said region of each of the curved surfaces will occur in three mutually orthogonal planes; one lying orthogonal to said axis, and the other two lying parallel with said axis.

In one embodiment of the present invention, the first and second bodies are identical, with each first member seating in a pair of convergent second surfaces defined by an adjacent pair of second members, and each second member seating in a pair of convergent first surfaces defined by an adjacent pair of first members. Many further embodiments exist. For example the first members may have requisitely curved regions, while only three second members are provided, which may for example be cylindrical rollers, balls or plane-faced gear teeth. Alternatively, the first members are plane-faced, and three or more second members are provided, having requisitely curved regions.

Various alternative embodiments of the present invention will now be described in detail, by way of example, and with reference to the accompanying drawings in which:

DETAILED DESCRIPTION OF THE PREFERRED EMBODIMENTS

Referring now to FIGS. 1-5, an indexing mechanism includes first and second bodies 10,12 rotatable relative to each other about an axis A, between a plurality of indexed positions which are provided at discretely spaced angular orientations about the axis A. Additionally, the bodies 10,12 are relatively movable in an axial direction, in order to facilitate disengagement from a given indexed position, followed by relative rotation about the axis A of the bodies 10,12, and subsequently re-engagement into a further indexed position. A suitable mechanism providing both rotation and axial movement is known per se from our prior published European patent application no. EP 392660 and will not be described further.

Figure 1:
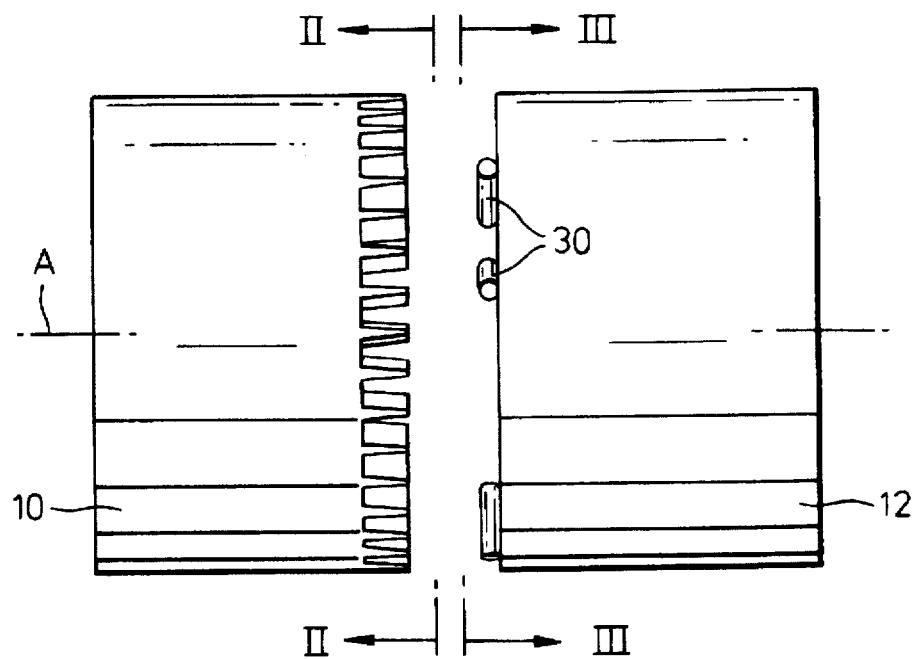
FIG. 1 is a side elevation of an indexing mechanism according to the present invention.
Figure 2:
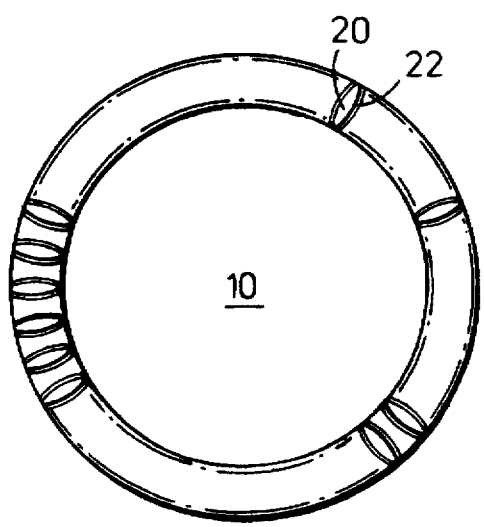
FIG. 2 is a section on II—II in FIG. 1.
Figure 3:
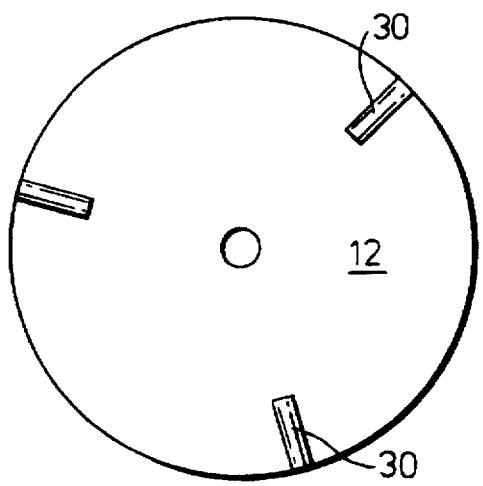
FIG. 3 is a section on III—III in FIG. 1.
Figure 4:
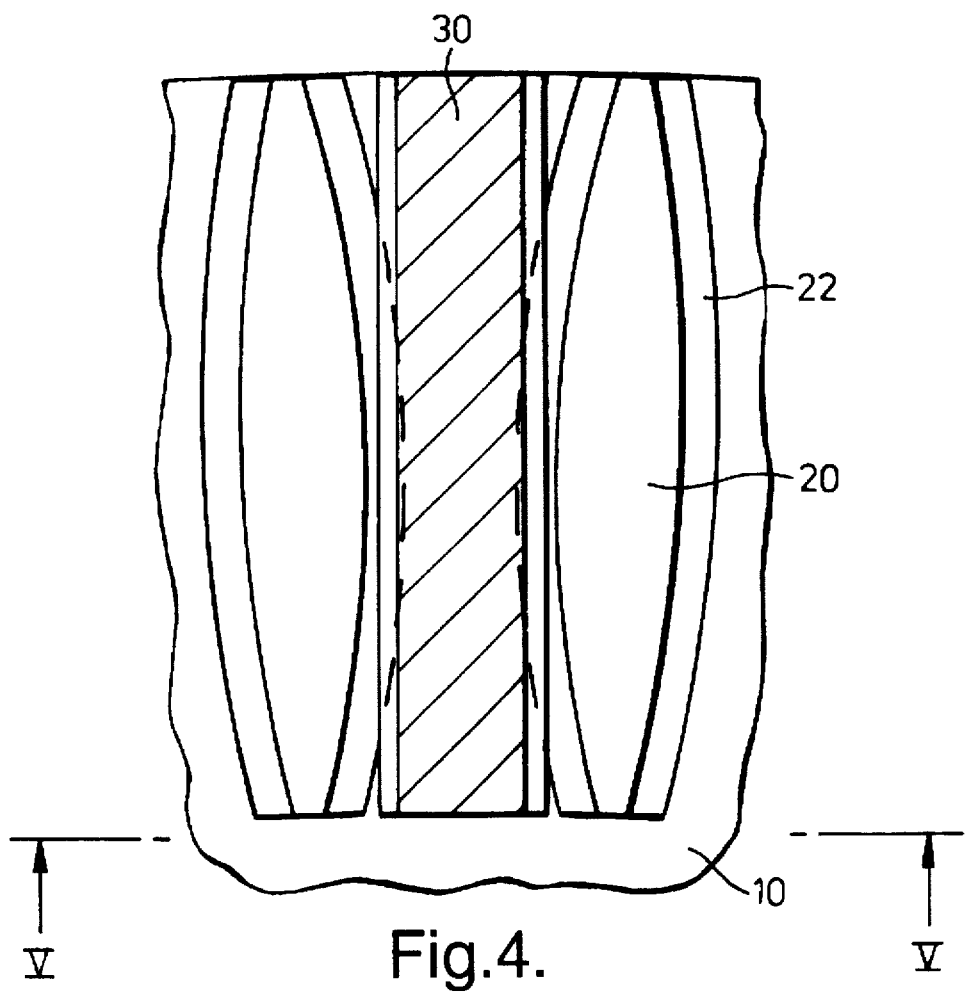
FIG. 4 is a sectional detail.
Figure 5:
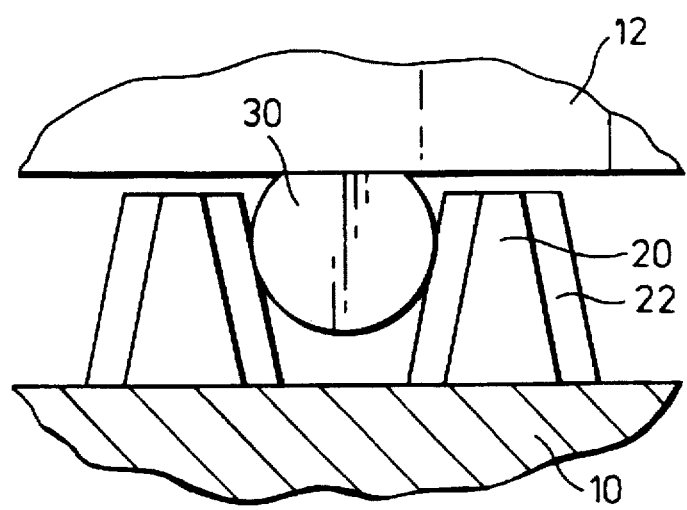
FIG. 5 is a plan view along V—V in FIG. 4.

A plurality of identical elongate first members 20 are provided in a circular array, on the end surface of the first body 10 confronting the second body 12, and at equispaced angular intervals, thereby to define a substantially castellated periphery to the first body 10. The first members 10 extend radially with respect to the axis A, are symmetrical about a radial axis of symmetry, and each comprise a pair of circumferentially spaced surfaces 22 which are curved in a plane orthogonal to the axis A (i.e. the plane of the paper in FIGS. 2 and 4). Additionally, the surfaces 22 are inclined such that mutually confronting surfaces of adjacent members 20 are mutually convergent, and define a cleft as is best illustrated in FIG. 5.

The end face of the second body 12 which confronts the first body 10 supports three radially extending and equispaced cylindrical second members 30. The second members have circumferentially spaced surfaces provided by opposite, circumferentially spaced, sides of their cylindrical bodies. The geometry of the array of first members 20, and angular spacing of the second members 30 is such that upon relative axial movement of the first and second bodies 10,12 each second member 30 may simultaneously seat in a cleft between two first members 20, defined by a pair of mutually convergent surfaces 22, thereby defining one of a plurality of indexed positions. Rotation between indexed positions, as previously mentioned, is achieved by: axial disengagement of the first and second bodies 10,12; relative rotation between the first and second bodies 10,12 which may, if desired, be facilitated by automatic means such as a motor, encoders and a suitable servo mechanism; and axial re-engagement between first and second bodies 10,12 at a new indexed position. In a modification, the surfaces 22 are only curved over the region in which they contact the surfaces of the cylindrical second members 30.

The curvature of the surfaces 22 is large in comparison with the distance between adjacent members. Specifically the radius of curvature is grater than half the separation of adjacent first members 20. This construction enables the provision of indexing in relatively fine angular increments while providing large-scale curved surfaces for location. The provision of such surfaces by providing e.g. a ring of balls of suitable radii would greatly increase the angular increments over which indexing takes place, thus reducing the number of indexed positions; alternatively, the provision of indexing in equally fine angular increments by means of an appropriate number of balls in a circular array would require balls of a relatively small radius, thus greatly reducing their radius of curvature.

The curvature of the surfaces 22, and the provision of only three cylindrical second members 30 results in a quasi-kinematic support between the first and second bodies 10,12. The support cannot be said to be completely kinematic because the relatively large radii of curvature of the surfaces 22 provide a contact zone between the surfaces 22 and cylindrical second members 30 which is substantially larger than that of a traditional kinematic support (see for example, the kinematic support shown in U.S. Pat. No. 4,153,998). However, we have found the positional repeatability of the two bodies in a given indexed position, from one instance at which the two bodies 10,12 are engaged in that position to another, still to be very good. Additionally, the provision of surfaces 22 with a relatively large radius of curvature ensures greater stiffness of the indexing mechanism when the first and second bodies 10,12 are engaged than would be the case with the more tightly curved surfaces of a traditional kinematic support. The stiffness of this indexing mechanism is however somewhat lower than the stiffness of a traditional Hirth coupling, but the provision of curved surfaces will provide a greater dirt immunity, and necessitate lower manufacturing precision. In a modification the second body 12 has an identical form to that of the first body 10. This indexing mechanism is then somewhat analogous to a traditional Hirth coupling, with the important difference that the surfaces 22 of the members provided on both the first and second bodies 10,12 are curved. In a further modification, the cylindrical second members 30 are replaced by elongate members having a vee-shaped cross section and plane surfaces.

Figure 6:
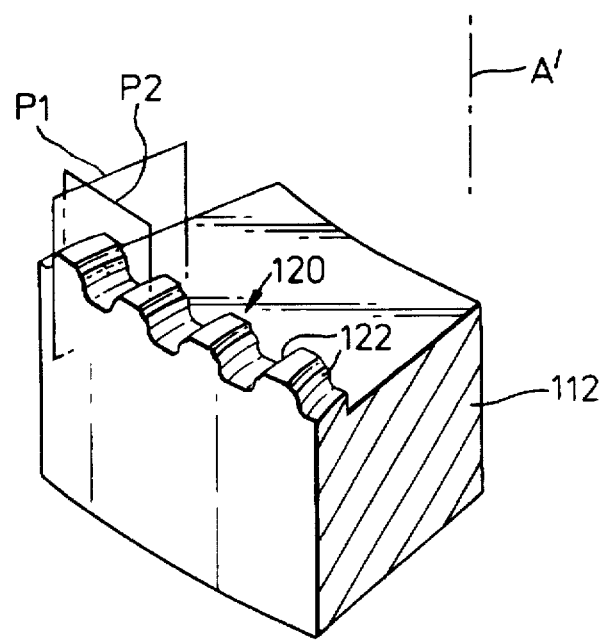
FIGS. 6 and 7 are perspective views of a second embodiment of the present invention.
Figure 7:
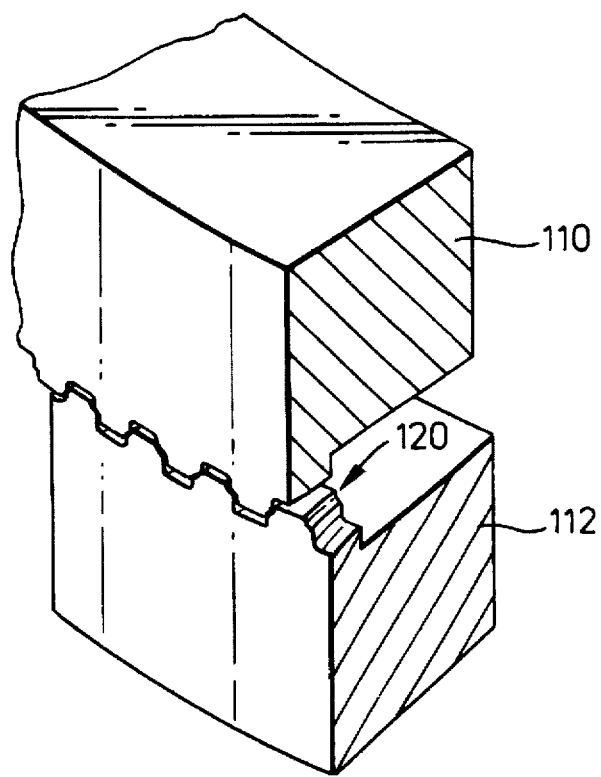

Referring now to FIGS. 6 and 7, a further form of indexing comprises identical first and second cylindrical bodies 110,112 which are rotatable relative to each other about an axis A'. Each of the bodies 110,112 has, at its periphery, a plurality of elongate equispaced engagement members 120 extending substantially radially with respect to the axis and being symmetrical about a radial axis of symmetry. Each engagement member 120 has a pair of circumferentially spaced surfaces 122, and mutually confronting surfaces from adjacent engagement members 120 are inclined so as to be mutually convergent. The surfaces 122 are curved in a first quasi radial plane P1 which lies parallel with the axis A; the surfaces 122 are curved in a second quasi tangential plane P2 which lies parallel with the axis, and orthogonal to plane P1; and the surfaces 122 are additionally curved in a plane orthogonal to axis A, which is not represented in FIG. 6. This latter curvature, being (in this embodiment) a function of the grinding procedure by which the members 120 are formed, in which the depth of the grinding wheel is greatest at the radially inner and outer extents of the members 120, is partly concealed by the greater spacing between confronting surfaces 122 of adjacent members at their outer periphery, because the members are arranged in a circular array. The radii of curvature in at least the first plane P1, and the last-mentioned plane is substantially greater than half the spacing between adjacent engagement members 120. In this example, the radius of curvature in the second-mentioned plane P2 is relatively small in comparison to the aforementioned spacing.

In a further modification of the present invention, one of the bodies 110,112 may be provided with three or more members 120 which have: plane surfaces; surfaces curved in one, two or three planes; or surfaces provided by balls or cylindrical rollers.

In a further modification to both the first and second embodiments, one of the bodies 10,12,110,112 may be provided by a standard ring of gear teeth, such as is employed in a conventional Hirth coupling, while three or more members are provided on the other body which have surface regions requisitely curved in one or more planes.

In the specification, frequent reference has been made to a "radius of curvature" of the curved surfaces. This does not necessarily imply that the surfaces must be circular or spheroidal. The term "radius of curvature" is intended, as appropriate, in a more general way, as defining the extent of curvature in relation to the spacing between adjacent members. For example, the surfaces may be curved in accordance with a section of a parabola, or an ellipse and so on. In this event, "radius of curvature" may for example be the distance of the curved surface from its focus, for example.

Indexing mechanisms described herein will typically be employed in an articulating probe head used on a coordinate positioning machine. Such probes heads are known from e.g. EP 392660.

I claim:

1. An indexing mechanism having: a first body which has a circular array of first members, each of the first members having a pair of circumferentially spaced first surfaces, and confronting first surfaces from adjacent first members being mutually convergent;

a second body rotatable relative to the first body, which has at least three second members, each of the second members, having a pair of circumferentially spaced second surfaces, which are adapted to seat in a cleft defined by a pair of mutually convergent first surfaces; wherein the members on at least one of the bodies are symmetrical about a radially extending axis of symmetry, and have a surface region which is curved in a plane orthogonal to the axis, and whose radius of curvature is greater than half the distance between centers of adjacent first members.

2. An indexing mechanism according to claim 1 wherein the first and second bodies are identical.

3. An indexing mechanism according to claim 1 wherein only three second members are provided on the second body, and wherein each of the circumferentially spaced second surfaces has a region which is curved and has a radius of curvature greater than half the distance between the centers of adjacent first members.

4. An indexing mechanism according to claim 1, wherein each of the members has a first surface including a region having a radius of curvature greater than half the spacing between the centers of adjacent first members.

5. An indexing mechanism according to claim 4 wherein the second members are provided by cylindrical rollers.

6. An indexing mechanism according to claim 1 wherein the first surfaces of the first members are plane surfaces.

\* \* \* \* \*